Jan. 9, 1934.  R. E. SHEAL ET AL  1,942,839
SELF UNLOADING BOAT
Filed Sept. 30, 1929  8 Sheets-Sheet 1

Inventors.
ROBERT E. SHEAL.
CLIFTON N. WINDECKER.
Kwis Hudson & Kent
Attys.

Inventors.
ROBERT E. SHEAL
CLIFTON N. WINDECKER

Inventors
ROBERT E. SHEAL.
CLIFTON N. WINDECKER.
Kwis Hudson + Kent.
Attys.

Patented Jan. 9, 1934

1,942,839

UNITED STATES PATENT OFFICE 1,942,839

SELF-UNLOADING BOAT

Robert E. Sheal, Cleveland, and Clifton N. Windecker, Painesville, Ohio

Application September 30, 1929
Serial No. 396,144

5 Claims. (Cl. 214—15)

This invention relates generally to ships, and more particularly to cargo carrying ships of the self-unloading type used in transporting bulk cargoes of materials such as sand, gypsum, cement, ore, grain, coal, crushed stone and the like, which can be readily loaded into and discharged from such vessels.

Self unloading vessels of the type to which this invention relates, are in general constructed according to the hull design known as the Great Lakes type, and may be propelled by steam, electric or other power means. The cargo carrying space of these vessels usually extends from the forward part of the ship to the after part, including the midship section, and is divided into compartments by the usual transverse bulkheads. Hatches are provided in the deck through which the cargo is delivered into the hold. The bottom of the cargo hold is hopper shaped, so that in unloading the cargo from the hold, the material can be discharged onto conveyors and delivered over the side of the vessel.

In these self-unloading vessels as heretofore constructed, the unloading of the cargo entails numerous and undesirable drops of the material, causing serious breakage and degradation of such friable materials as bituminous coal, certain classes of crushed rocks, and some other bulk materials; resulting in considerable depreciation in the value of the cargoes thus transported. These drops of the material not only result in depreciation of the cargoes transported, but destroy chutes, hoppers and other parts of the handling equipment, and also are a source of undesirable noise and vibration.

Furthermore, these self-unloading vessels, as heretofore constructed, usually have been of complicated design and construction, resulting in a high cost of construction, operation and maintenance; and also resulting in a reduction in the net carrying capacity. It is also true that in many cases vessels, which have been constructed to embody a complicated form of unloading apparatus, have a high center of gravity when loaded, which is very undesirable and is frequently dangerous to the safety of the vessel.

In unloading vessels of this type, in which the cargo is discharged from hoppers directly onto conveyor belts the material, when of a lumpy nature, usually does not flow freely but tends to stick and cause the formation of arches requiring considerable hand poking labor to maintain a flow from the hopper openings, and moreover, this means of feeding the material onto the conveyor belts frequently causes flooding and uneven and intermittent loading of the belts.

Therefore, with a view to overcoming many of these undesirable features it is an object of this invention to provide a cargo carrying vessel of the self-unloading type, in which handling breakage of the material transported is largely eliminated.

Another object of this invention is to provide a cargo carrying vessel having an improved form of unloading apparatus, in which means is provided for evenly and continuously feeding the material from the hoppers to the conveyor; in which traveling feeding devices are provided for delivering the material from the hoppers to the conveyor; in which mechanical means is provided on the traveling feeders for actuating the hopper gates; in which a novel form of elevating device is employed for elevating and transferring the material to the boom conveyor for delivery over the side of the vessel; in which the delivery boom is provided with an improved form of hopper for feeding the material to the boom conveyor, and in which means is provided for reducing the noise and vibration incident to the handling of the materials.

Still another object of this invention is to provide a cargo carrying vessel of the self-unloading type having a hold with a continuous hopper bottom in which substantially continuous longitudinal openings are provided to afford a maximum area for the discharge of the materials.

A further object of this invention is to provide a cargo carrying vessel of the self-unloading type having unloading apparatus which will enable the vessel to efficiently discharge fine materials as well as lumpy materials.

The invention may be further briefly summarized as consisting in certain novel combinations and arrangements of parts hereinafter described and set out in the appended claims.

In the accompanying sheets of drawings,

Fig. 18 is a sectional view taken on line 18—18 of Fig. 17.

Figures 1, 2:
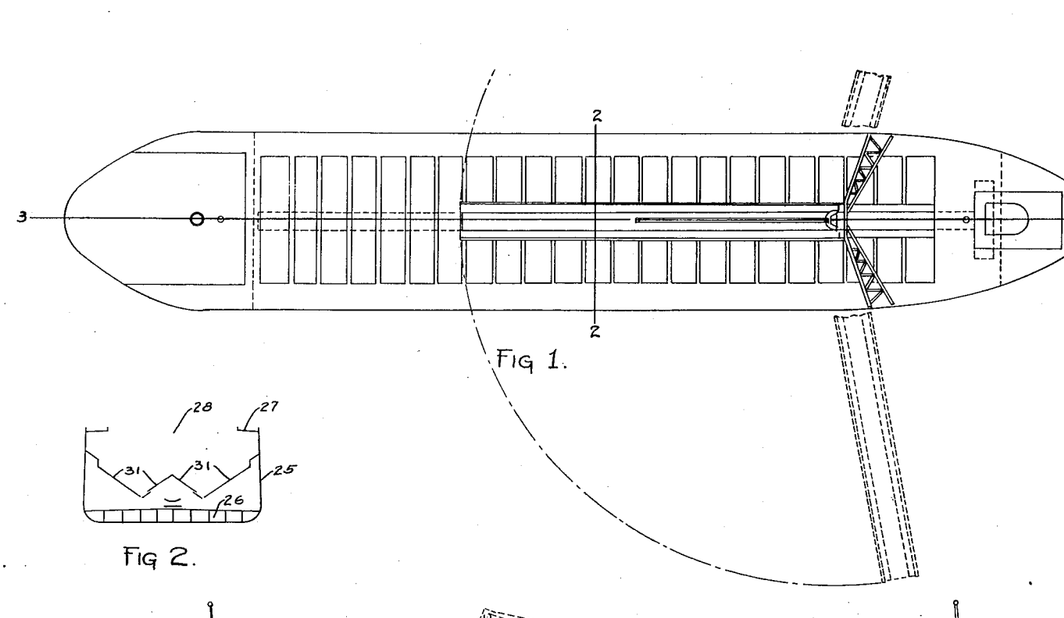
Fig. 1 is a top plan view of the self unloading vessel of our invention.
Fig. 2 is a transverse section of the vessel taken on line 2—2 of Fig. 1.
Figure 3:
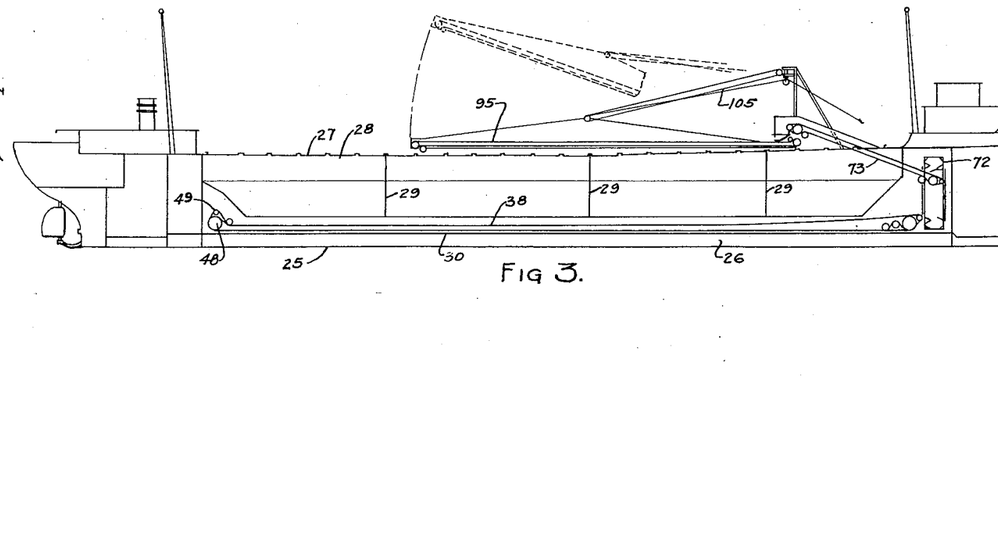
Fig. 3 is a longitudinal section taken on line 3—3 of Fig. 1.

The self-unloading vessel of our invention, as illustrated in the drawings, embodies the hopper type of cargo hold from which the cargo of bulk material is discharged and conveyed, preferably, to a forward point of the vessel, where it is elevated above the deck and then delivered over the side. In Figs. 1, 2 and 3 of the drawings we have shown diagrammatically the general design of the vessel embodying our invention, which it should be understood is not limited in its application to new ships, but is equally suitable for the remodeling of certain types of old ships. The hull of the vessel has been represented generally at 25 and is constructed along the usual lines of bulk cargo carrying vessels, having water ballast tanks 26 arranged along the bottom or bilge, and having the customary deck 27 provided with spaced hatch openings 28 through which the cargo is delivered into the hold. As indicated in the drawings, the cargo hold extends continuously from the forward part of the vessel to its after part, and this cargo carrying space, may, if desired, be divided into compartments by means of the transverse bulkheads 29.

According to the usual form of construction for bulk cargo vessels, the hold includes all of the space between the deck 27 and the tank top 30, but for facilitating the unloading of the cargo we have provided the cargo space with a hopper shaped bottom 31 spaced above the tank top. This hopper bottom, which extends substantially the full length of the cargo hold, comprises longitudinally extending inclined sides 32 and a longitudinally extending central ridge 33 having inclined sides 34. The sloping sides 32 and the ridge 33 are arranged to form the parallel valleys 35 from which the cargo is discharged through continuous rows of spaced openings 36 provided in the inclined sides 34 adjacent the junction between these sides and the sloping sides 32, that is to say, adjacent the lowest point of the valleys. These openings, which are adapted to be closed by sliding gates 37, are spaced as close together as the construction of the vessel will permit to afford the maximum area for the discharge openings, so that arches which tend to form as the material is being discharged from the hoppers, can be broken down by opening gates at the necessary points. In constructing the hopper bottom, the sides 32 and 34 are inclined at an angle suitably steep to cause the various materials carried, to slide readily, and to facilitate the movement of the materials, the surfaces of the inclined sides are made smooth and free from protruding rivet heads or other obstructions. The hopper bottom is located as close to the bottom of the ship as is practicable, in order that the center of gravity of the cargo carried may be as low as possible, and also to provide the maximum cargo space.

Figures 7, 8:
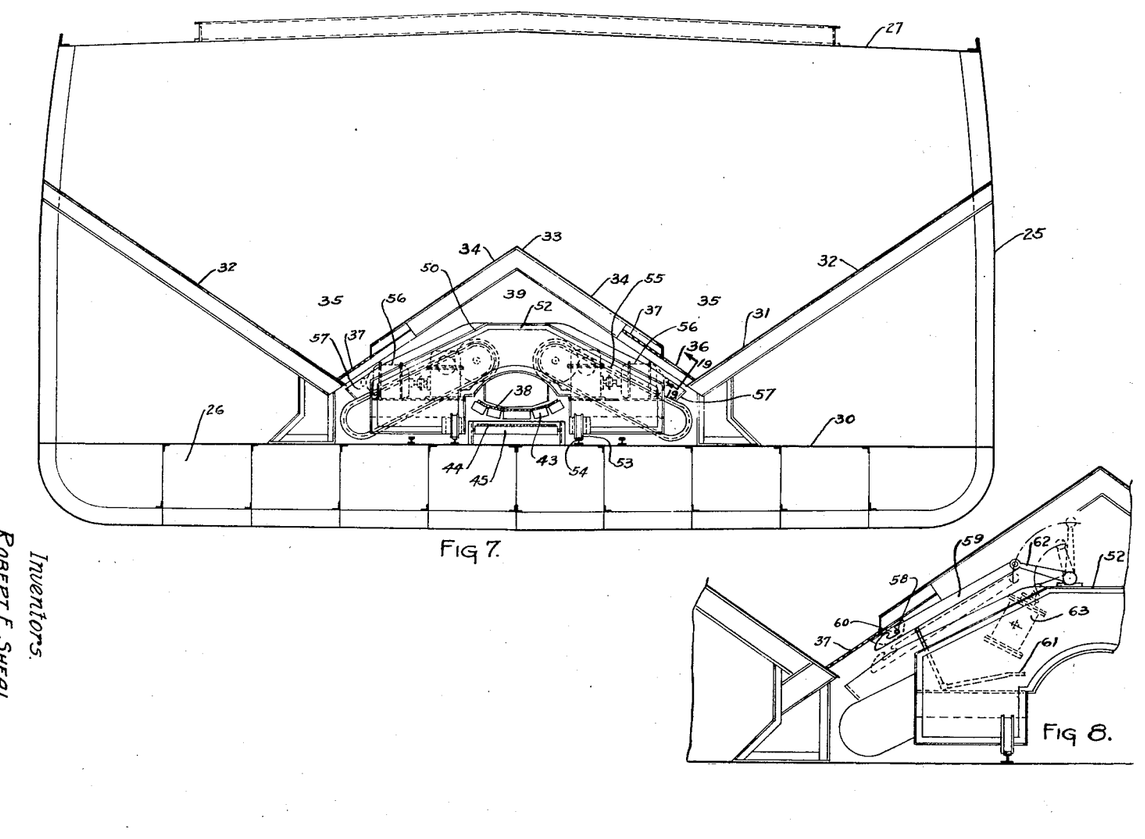
Fig. 7 is a transverse section taken on line 7—7 of Fig. 4 showing the main traveling feeder.
Fig. 8 is a fragmentary elevational view of one of the feeders showing the gate actuating mechanism carried thereby.
Figure 9:
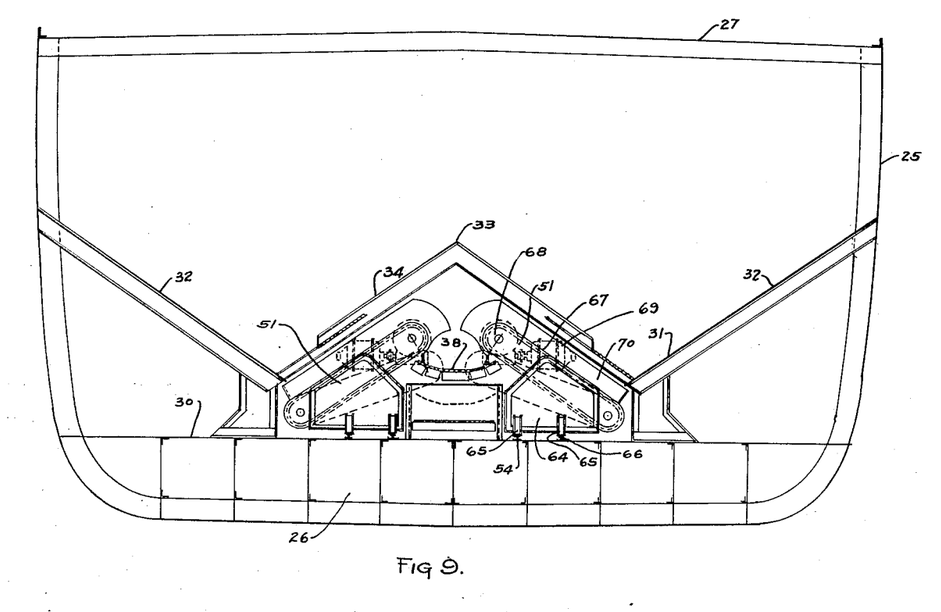
Fig. 9 is a transverse section taken on line 9—9 of Fig. 4 showing the auxiliary feeders.

The space between the hopper bottom and the tank top, as clearly shown in Figs. 2, 7 and 9 is divided into longitudinally extending tunnels in which is arranged unloading apparatus for discharging the cargoes carried. This apparatus, according to the embodiment of our invention illustrated, comprises an endless belt conveyor 38 which extends substantially the full length of the central tunnel 39 for conveying the material being unloaded to a forward point of the vessel. This conveyor belt is preferably of the type known as the "Duplex" type, that is, made up of two separate belts comprising an upper wearing belt 40 and a lower load or driving belt 41. The forward moving or load carrying portion 42 of the conveyor belt rests upon suitably spaced roller supports 43, and the after moving or return portion 44 of the conveyor belt is carried by the roller supports 45. The supports 43 are made up of a plurality of rollers arranged so as to cause the conveyor belt to assume an arcuate or trough-like form, making it unnecessary to use skirt boards for retaining the material on the belt. At the forward end of the conveyor the load carrying belt 41 passes over a driving drum or pulley 46 which is driven by suitable means, such as, an electric motor for operating the conveyor belt. The wearing belt 40 passes over a pulley 47, at which point the material carried is discharged from the conveyor belt. At the after end of the conveyor the wearing belt and the load carrying belt pass around the pulleys 48 and 49, respectively, which are adjustably mounted to permit the belts being kept taut.

In unloading a cargo it is desirable that the material be fed continuously, and at a uniform rate from the hopper openings onto the conveyor belt, and for this purpose we provide one or more main feeders 50 and preferably but not necessarily, two or more auxiliary feeders 51, which receive the material from the hopper openings and transfer it to the conveyor belt. The main feeder is constructed in the form of a carriage having a U-shaped frame 52 arranged to straddle the main conveyor and provided with wheels 53 which travel upon supporting rails 54 laid upon the tank top. Two oppositely inclined endless conveyors or aprons 55 are carried by the frame 52 and arranged in a plane which extends transversely of the tunnel. These aprons are so positioned that their adjacent or discharge ends are disposed over the main conveyor, while their receiving ends extend outwardly beneath the rows of hopper openings. A suitable source of power, such as an electric motor 56, mounted upon the frame 52, may be provided for actuating the aprons individually and, if desired, for driving the wheels for propelling the feeder along the rails when it is necessary to shift the feeder from one set of hopper openings to another. During the operation of the feeder, material is discharged from the hopper openings onto the moving aprons which transfer the material to the main conveyor. A receiving hopper 57 is provided for each apron to prevent the material from falling off of the receiving end of the aprons. These hoppers are supported on the feeder carriages and are arranged to register with the hopper openings.

The hopper openings 36 are normally closed by the gates 37, but are opened for flooding the material upon the aprons of the feeder, when the carriage is positioned under the hopper openings at any desired point. In unloading a bulk cargo from a vessel of this type it is usual to unload at intervals along the length of the vessel, in order that the cargo may be discharged evenly throughout the length of the cargo hold, so that dangerous strains will not develop in the hull of the vessel, and so that a proper trim can be maintained. Therefore, in unloading the cargo it is customary to move the main and auxiliary feeders back and forth through the tunnel, and to position them under the gate openings at desired points, so that material can be discharged wherever necessary to maintain an even condition of unloading.

After one of the feeders is moved to a desired point along the tunnel, one or more of the hopper gates are opened at that point to the extent necessary to secure the proper rate of flow of material upon the apron feeders. For opening and closing these hopper gates, and for moving the gates to regulate the size of the opening, we have provided power operating mechanism which is mounted upon the feeder carriage, and cooperates with a rod or extension 58 secured to the underside of each gate. This operating mechanism comprises a swinging bar 59 having a slotted recess 60 formed adjacent one end, which may be moved into engagement with the extension 58 by pressing the foot pedal 61. After the slotted recess has been moved into engagement with the extension 58 the bar 59 is moved in the direction of travel of the gate to open or close the same, by means of a pivoted actuating lever 62. The lever 62 is adapted to be moved by suitable power means, such as the piston of the oscillating air cylinder 63, which is controlled by the operator stationed upon the feeder. While we have disclosed one form of apparatus which may be used for opening or closing the gates, it should be understood, however, that any suitable means may be employed for this purpose.

Throughout the major portion of its extent the main conveyor belt 38 is substantially parallel with the tank top 30, but at the forward end of the vessel it is inclined upwardly to properly discharge the material carried thereby, into the elevating apparatus. For obvious reasons, it is desirable that the hopper bottom of the cargo space, which extends above the inclined portion of the conveyor belt, be made continuous with the hopper bottom of the cargo space which extends above the major portion of the conveyor belt. The necessary rise in the main conveyor belt reduces the space between the conveyor and the top of the tunnel which makes the use of the main feeders at this point impractical, and for unloading the portion of the cargo carried above the inclined end of the main belt, we provide the auxiliary feeders 51 which are used along this inclined portion of the conveyor, and may also be used for supplementing the main feeders throughout the full extent of the cargo hold.

These auxiliary feeders are constructed to operate in a manner somewhat similar to the manner in which the main feeders operate, and are constructed in the form of a carriage 64, which is provided with wheels 65 adapted to travel upon the rail 54 and upon a rail 66 which extends parallel with the rail 54. The carriage of each auxiliary feeder is provided with one endless belt or apron 67, upon which material is discharged from the hopper openings. The endless belt or apron 67 is arranged in an inclined position, with its outer or receiving end disposed beneath the row of hopper openings, and its inner or discharging end positioned over the main conveyor. In order that the discharge end of the apron may be positioned as close as possible to the main conveyor belt, so as to lessen the drop for the material discharged, we employ an adjustable mounting for the driving drum or pulley 68, which is provided at the discharge end of the apron. This adjustable mounting permits the angle of inclination of the apron to be changed for use at different points along the main conveyor. As shown in Fig. 9 the apron is illustrated in full lines in the inclined position which it would assume for use along the inclined portion of the main conveyor, and is illustrated in dotted lines in the inclined position which would be suitable for use along the horizontal portion of the main conveyor. A suitable source of power, such as an electric motor 69, is provided on each of the auxiliary feeder carriages for driving the apron, and if desired, for propelling the feeder along the track. Each of these feeders is also provided with a receiving hopper 70, which registers with the hopper openings and prevents the material discharged from the openings from falling off of the receiving end of the apron.

Figure 5:
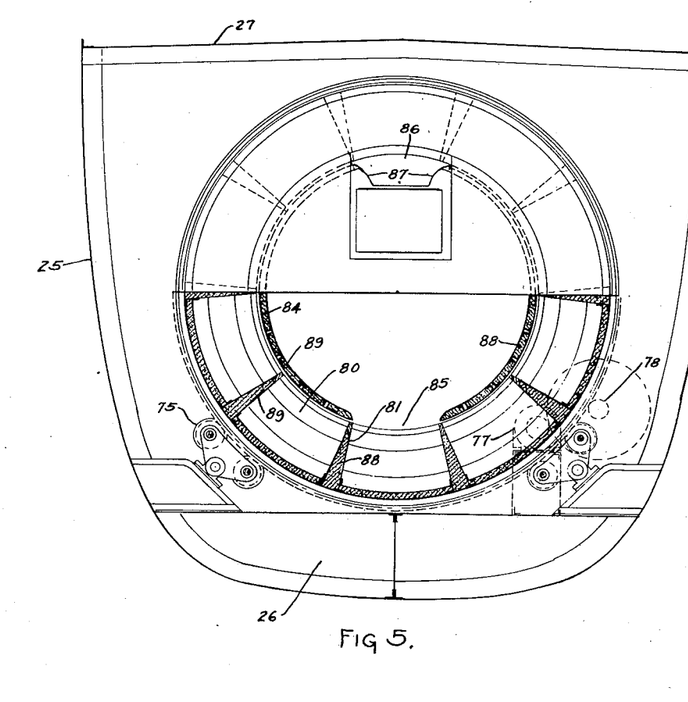
Fig. 5 is a sectional view taken on line 5—5 of Fig. 4, showing the elevating apparatus.
Figure 6:
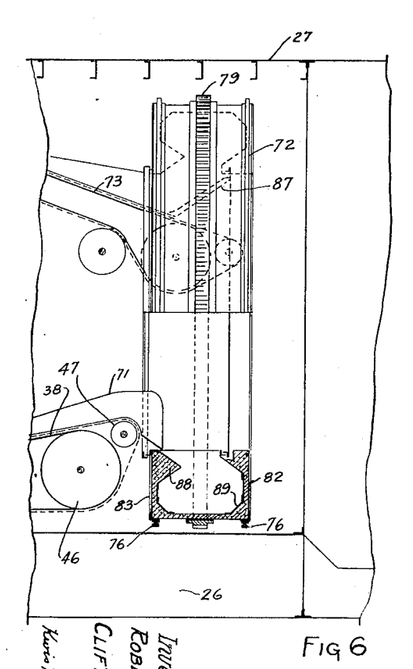
Fig. 6 is an elevation partly in section showing the apparatus of Fig. 5.

At the extreme forward end of the main conveyor the material is discharged from the main conveyor, and is directed by the chute 71 into the elevator 72 by means of which the material is raised and transferred to the inclined conveyor 73. This elevator, in its preferred embodiment, is constructed in the form of a drum 74 of large diameter, arranged with its axis substantially coincident with the fore and aft center line of the ship, as shown in Figs. 5 and 6 of the drawings. The drum is supported for rotation upon pivoted rollers 75 which engage the tracks 76 extending around the outer surface of the drum. The drum is adapted to be rotated in either direction by suitable means, such as an electric motor 77, arranged to drive the pinion 78 which engages the annular gear 79 provided on the external periphery of the drum.

The interior of the drum is divided into pockets 80 by a plurality of circumferentially spaced radially extending vanes 81. The forward and rear ends or walls of the pockets are formed, respectively, by annular plates 82 and 83. The chute 71 of the main conveyor extends into the central opening of the drum, as clearly shown in Fig. 6, for discharging the material into the pockets, while the drum is being rotated. Arcuate stationary plates 84 are supported within the central opening of the drum adjacent the inner ends of the vanes 81. These arcuate plates are arranged with spaces 85 and 86 between their ends at diametrically opposed points, so that when the moving pockets reach these spaces they are open on one side. The space 85 provides an opening into each pocket from above, through which material may be received from the chute 71 for filling each pocket as it passes this space. The space 86 provides an opening into each pocket from below as the drum is rotated, which permits the charges of material carried in the pockets to be discharged into the chute 87 arranged below the space 86. Thus as each pocket passes the space 85 a charge of material is received, and upon rotation of the drum the pocket is closed by one of the stationary plates 84. Upon further rotation of the drum the stationary plate 84 becomes the bottom of the pocket and supports the charge until the space 86 is reached, at which point the charge falls into the chute 87 and is delivered thereby to the inclined conveyor 73.

For the purpose of reducing the undesirable noise and vibration, which would normally accompany the discharge of material from the main conveyor into the elevator pockets and the movement of the material within the pockets, we have provided the elevator 72 and the arcuate plates 84 with a form of construction which largely eliminates these undesirable features, by deadening the sound and dampening the vibrations. This deadening of the sound and dampening of the vibrations is accomplished by providing resilient backing material 88, such as wood blocks or other suitable non-metallic substance behind the metal plates 89 which form the drum structure and make up the stationary plates 84.

Figures 4, 19, 20:
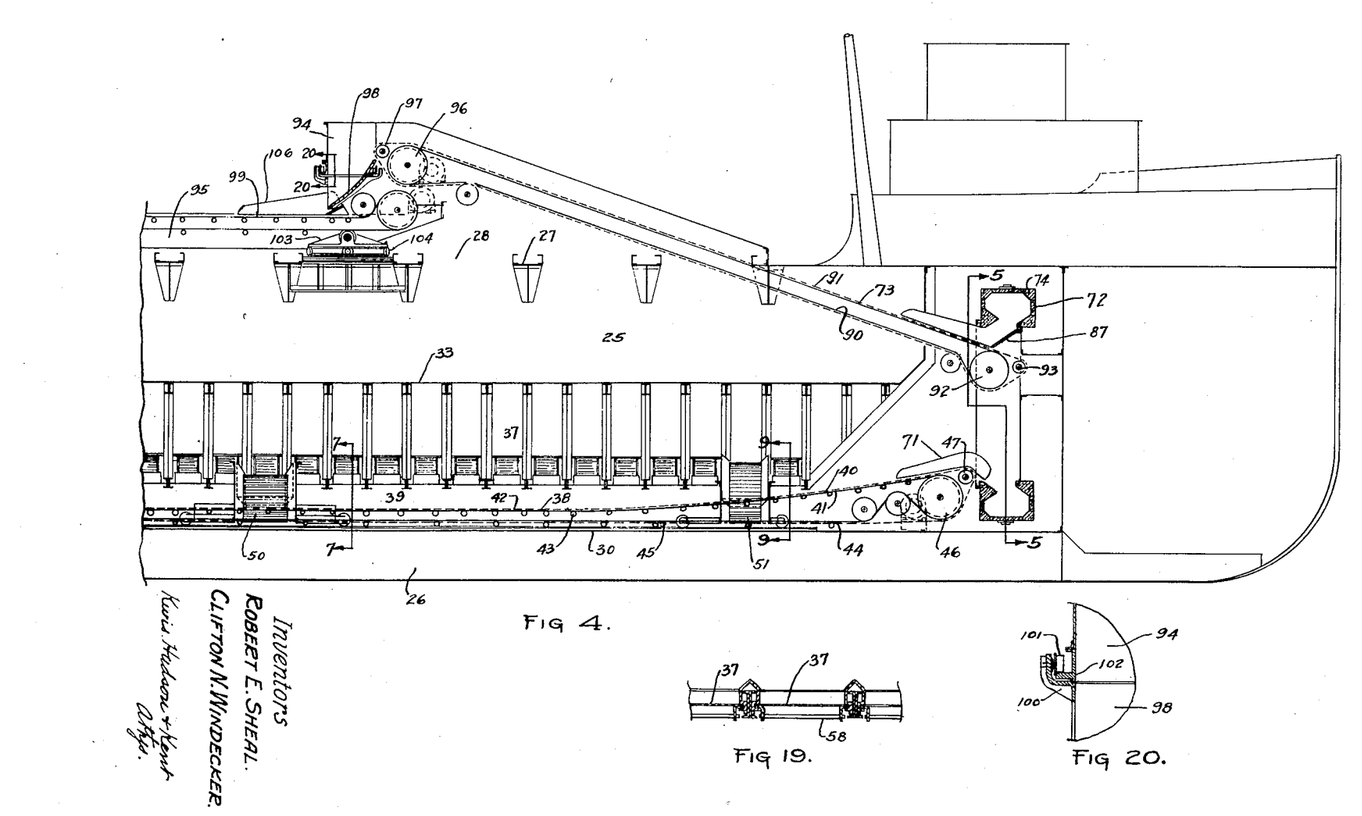
Fig. 4 is a longitudinal sectional view of the forward part of the vessel.
Fig. 19 is a sectional view taken on line 19—19 of Fig. 7.
Fig. 20 is a fragmentary sectional elevation showing the hopper supporting means.

The inclined conveyor 73, in the arrangement illustrated, is of the "duplex type", that is, made up of an endless load carrying belt 90 which supports and drives an endless wear belt 91. The receiving end of the inclined conveyor extends into the central opening of the elevator, at which point the load carrying belt 90 passes around the drum 92, and the wear belt 91 passes around the drum 93. Material is delivered to the inclined belt from the elevator by means of the chute 87, and is discharged from the inclined conveyor into the hopper 94 at a point above the deck 27. This hopper is positioned above the inner end of a swinging boom 95, by means of which the material is delivered over the side to a point remote from the vessel. At the discharge end of the inclined conveyor the load carrying belt 90 passes around the driving drum 96, while the wear belt 91 passes around the drum 97 and discharges the material into the hopper 94. The discharge end of the inclined conveyor and the upper part of the hopper 94 are permanently supported above the inner end of the boom. The lower part of the hopper 94 is constructed in the form of a chute 98 which delivers the material from the hopper onto the endless boom conveyor 99. The chute 98 is supported at the lower end of the hopper 94, so as to permit it to be moved laterally with respect to the hopper as the boom is swung to different horizontal positions. The supporting means, as shown in Fig. 20, comprises wheel brackets 100 spaced around the chute and supported on wheels 101 which travel upon the track formed around the lower part of the hopper by the member 102.

The boom is of a well known form of construction, having its inner end pivoted to the member 103 which forms the upper part of a turntable and is supported upon roller bearings 104. The mounting of the inner end of the boom permits the latter to be raised and lowered, and to be swung out from either side of the vessel. Suitable means, such as the tackle 105, is provided for supporting the boom and for moving the same to the desired positions. Skirt plates 106 are secured to the boom along opposite sides of the boom conveyor 99 at the point where the chute 98 discharges the material onto this conveyor. As the boom is swung laterally the skirt plates engage one side or the other of the chute 98, and cause the same to be swung through a corresponding angle. Thus the material fed from the hopper 94 is always discharged in the direction of travel of the boom conveyor. If desired the chute 98 may be swung by means of arms attached to the boom instead of by engagement with the skirt plates.

Figure 10:
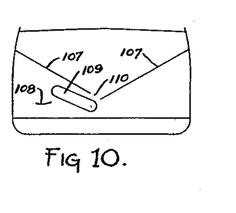
Fig. 10 to Fig. 14 inclusive are diagrammatic transverse sectional views showing different arrangements of hoppers and conveyors.

In Figs. 10 to 14 inclusive of the drawings we have shown other cross-sectional shapes which the hopper bottomed cargo hold may assume. In Figure 10 the hopper bottom is formed with a single central valley formed at the meeting line of the two inclined sides 107. In this form of construction the main conveyor 108 is positioned to one side of the central line of the ship with a traveling feeder 109 arranged between the main conveyor and the row of discharge openings 110 provided along the bottom of the valley.

Figure 11:
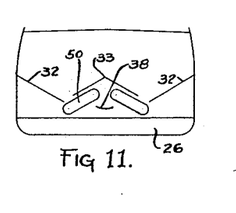

The form of construction illustrated in Fig. 11 is substantially the same as the form of construction shown in Figure 2 and already described in detail, and is included in this group of figures for the purpose of comparison.

Figure 12:
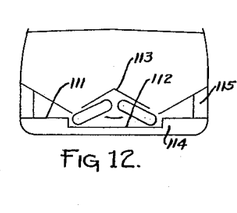

In Fig. 12 we have shown a form of construction by which the center of gravity of the cargo can be kept at a lower point than is customary with hopper bottomed cargo holds. In this form of construction the tank top 111 is provided with a longitudinal recess 112 which extends along below the tunnel formed by the central ridge 113. The recess 112 detracts from the volume of the water ballast tanks 114 provided along the bottom of the vessel, and this reduction in the volume of the bottom tanks is compensated for by providing the side ballast tanks 115 of enlarged capacity.

Figure 13:
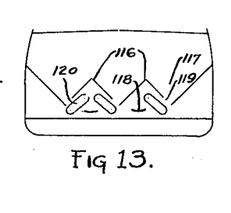

In Figure 13 we have illustrated another form of construction in which the bottom of the cargo hold is provided with two longitudinally extending ridges 116 and three longitudinally extending valleys 117. This arrangement of ridges and valleys forms two longitudinally extending tunnels which are both provided with conveyor belts 118. Material is discharged from the row of openings 119 at the bottom of each valley, and is transferred from these openings to the conveyors by a traveling feeder 120 provided for each row of openings.

Figure 14:
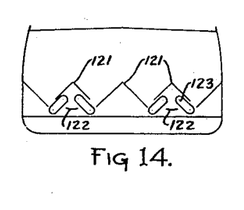

In the form of construction which we have illustrated in Figure 14 the cargo hold is provided with a hopper bottom which is constructed with three longitudinally extending ridges 121. Conveyors 122 are arranged in the tunnels formed by the two outboard ridges and each of these conveyors is loaded with material by means of a pair of traveling feeders 123.

Figure 15:
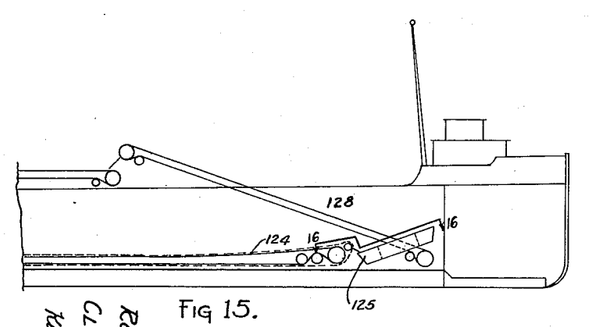
Fig. 15 is a diagrammatic longitudinal sectional view showing another form of elevating apparatus of our invention.
Figure 16:
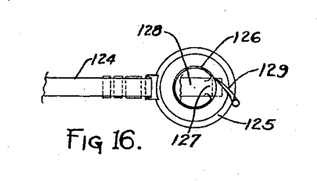
Fig. 16 is a sectional view taken on line 16—16 of Fig. 15.

In Figures 15 and 16 we have illustrated another form of elevator for transferring the material from the main conveyor to the inclined conveyor. In this arrangement a main conveyor 124 discharges material into the annular trough of the revolving drum 125. The outer wall of the drum forms the outer wall of the trough, but the inner wall of the trough is formed by a stationary wall 126 having an opening 127 provided therein at a point diametrically opposite the discharge end of the main conveyor. The receiving end of an inclined conveyor 128 extends through the central opening of the elevator drum and is arranged below the opening 127. A movable scraper or deflector plate 129 is adjustably positioned within the trough of the drum and upon rotation of the drum deflects the material carried thereby, causing it to be discharged through the opening 127 onto the inclined conveyor 128.

Figure 17:
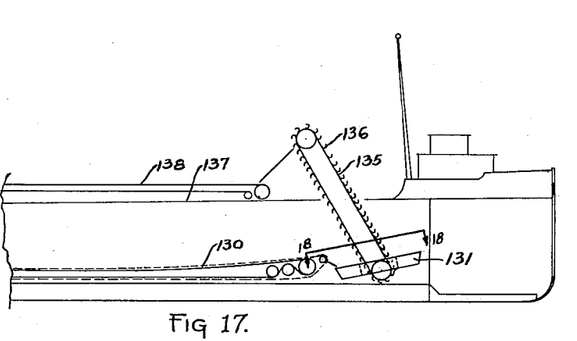
Fig. 17 is a diagrammatic longitudinal sectional view showing still another form of elevating apparatus.

In Figures 17 and 18 we have illustrated still another form of elevating apparatus. In this arrangement the material discharged from the main conveyor 130 drops into the trough of an inclined rotating drum 131. Upon rotation of this drum the material is scraped or deflected by means of the deflector plate 132 and is discharged through the opening 133 provided in the stationary inner wall 134, onto the receiving end of an inclined elevator 135 which projects through the central opening of the inclined drum. This inclined elevator comprises an endless belt having a plurality of spaced buckets 136 mounted thereon. During the operation of this elevating apparatus, the material scraped or deflected from the trough of the rotating drum by the deflector 132, is picked up by the buckets 136 and is carried to a point above the deck 137 of the vessel, where it is transferred to the boom conveyor 138. This arrangement permits the swinging boom to be supported at a desirable point on the deck of the vessel.

Figure 21:
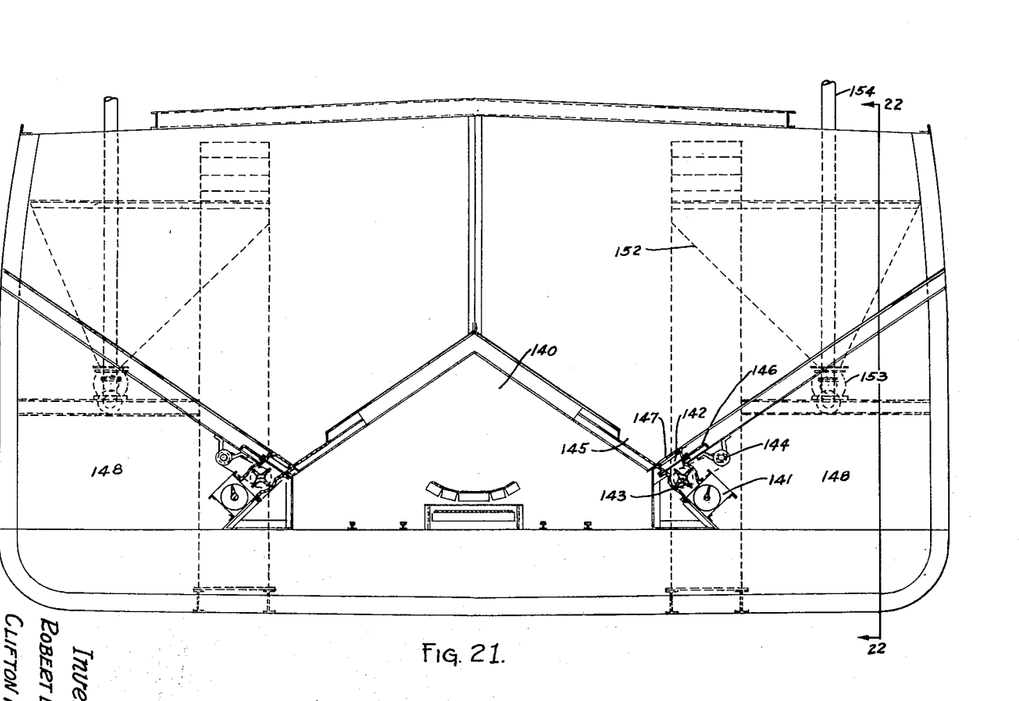
Fig. 21 is a transverse sectional view of another form of self-unloading vessel of our invention.
Figure 22:
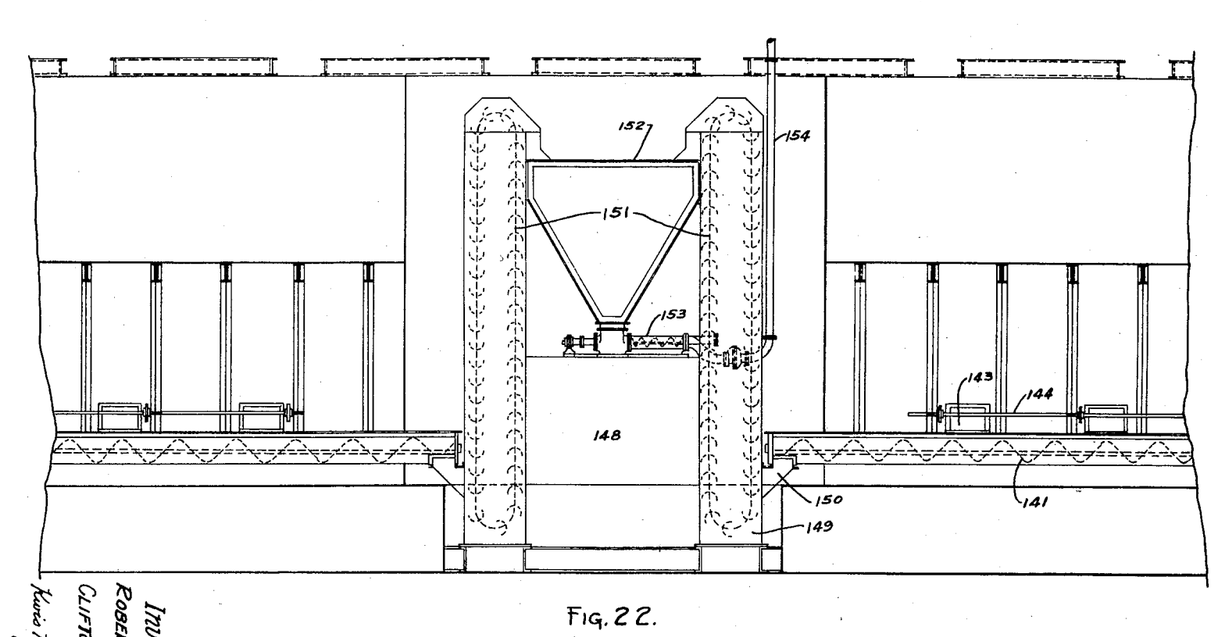
Fig. 22 is a longitudinal sectional view taken on line 22—22 of Fig. 21.

In Figs. 21 and 22 we have shown another form of self-unloading vessel which is adapted to be used in transporting cargoes of fine material, such as cement, as well as cargoes of materials of a coarse and lumpy nature. The hopper bottom of the hold is substantially the same in form as the hopper bottom illustrated in Figs. 4 and 7 and already described in detail. In this form of vessel we provide unloading apparatus within the central tunnel 140 for handling coarse or lumpy materials when a cargo of this nature is transported. This apparatus is identical with unloading apparatus already described, and need not be described in detail. For unloading cargoes of fine or powdered materials, such as cement, we provide longitudinally extending screw conveyors 141, to which the material is fed from the rows of spaced openings 142 by means of rotary feeders 143 driven from the adjacent shafts 144. When a cargo of cement is being handled the discharge openings 145 which lead to the tunnel 140 are kept closed, and the openings 142 controlled by the sliding gates 146. When a cargo of lumpy material is being handled the gates 146 are kept closed, and in addition, the openings 142 are closed by covers 147 which are flush with the surface of the hopper bottom.

In unloading a cargo of cement the material is fed to the screw conveyors 141 and is pushed along by the screws to the elevator compartments 148 which are suitably located within the hold of the vessel. The material delivered by the screws is directed into the elevator hoppers 149 by means of chutes 150. Endless bucket elevators 151 pick up the material and dump it into the pump hopper 152. The material is fed by this hopper to a pump 153 of a well known form of construction which discharges the material through the pipe 154 to a point outside of the vessel. Heretofore, self unloading vessels have been designed to handle only one type of material, but with this arrangement of apparatus a self-unloading vessel may be used for transporting either fine or coarse materials, thus increasing the range of usefulness of the vessel.

From the foregoing description, taken in conjunction with the drawings illustrating the apparatus of our invention, it will be readily understood that numerous advantages are realized by our invention. The provision of feeders for supplying the material to the main conveyor eliminates overloading of this conveyor, which heretofore has made the use of skirt boards necessary, and which has been a troublesome occurrence. By the use of these feeders the material is fed evenly and continuously from the hopper openings to the main conveyor, so that the conveyor can be operated at full capacity for attaining maximum efficiency. The main conveyor is always within full view of the operator, stationed upon the feeder, and any condition of overloading or underloading of this conveyor can be quickly remedied by varying the speed at which the aprons are driven. These feeders constitute a positive and efficient means for regulating and controlling the discharge of material from the hold, whereby delays, due to clogging of discharge openings by lumpy material, are entirely eliminated.

The closely spaced discharge openings provide substantially continuous discharge openings throughout the length of the hopper bottom, making the use of cross-hoppering unnecessary. This arrangement affords maximum area for the discharge of the cargo, and makes it possible to avoid delays due to the formation of arches in the bulk cargo, by permitting the discharge of material at critical points which will cause such arches to be broken down.

Another advantage derived from our invention is the provision of the compact and efficient arrangement of elevating apparatus. By arranging the drum as illustrated in the drawings a minimum amount of space is taken up at the forward end of the ship, with the result that the cargo carrying space need be only slightly reduced in capacity to accommodate this apparatus. Furthermore our novel form of elevating apparatus permits the swiveled end of the delivery boom to be located close to one end of the cargo space, so that the boom will obstruct only comparatively few of the hatch openings, thus simplifying the operation of loading the cargo into the vessel. Another result realized by the elevating apparatus which we have provided, is the reduction in noise and vibration, by providing the nonmetallic material for backing the metallic parts of the elevator structure. The reduction of noise and vibration in apparatus of this kind contributes materially to the length of life of the apparatus and to the efficiency with which it may be operated.

A further advantage of great importance, which is realized by the apparatus of our invention is the elimination, to a large extent, of the depreciation of the material transported, due to handling breakage. This advantage is achieved by arranging the apparatus, so that the height of the drops which are necessary in transferring the material from one part of the conveying system to another, is reduced to a minimum. This reduction in the drops to which the material is subjected, reduces the breakage of friable materials transported, thereby preventing depreciation of the cargo.

The simplified form of the unloading apparatus of our invention permits the hopper bottom of the cargo hold to be placed comparatively close to the tank top of the ship, so that the center of gravity of the cargo carried is materially lowered. This lowering of the center of gravity of the cargo is an important achievement, since it contributes to the safety of the vessel and facilitates the handling of the vessel at all times.

Having thus described our invention, we claim:

1. In a self-unloading ship the combination of a cargo hold having a series of openings through the bottom thereof for discharging the material transported, gates for closing said openings, means for delivering said material at a point remote from the ship including a conveyor disposed adjacent said openings, a feeder adapted to travel along said series of openings for feeding the material to said conveyor, and actuating means carried by said feeder for opening and closing said gates.

2. In a self-unloading ship the combination of a cargo hold having a hopper bottom with a tunnel extending longitudinally beneath the same, said hopper bottom being provided with a series of openings for discharging material from said hold, means for delivering the material exteriorly of the ship including a conveyor in said tunnel, a feeder adapted to travel along within said tunnel for cooperation with the discharge openings, and positively driven means associated with said feeder for transferring material from said openings to said conveyor.

3. In a self-unloading ship the combination of a cargo hold having a hopper bottom with a tunnel extending longitudinally beneath the same, said hopper bottom being provided with a series of openings for discharging material from said hold, means for delivering the material exteriorly of the ship including a conveyor in said tunnel, a feeder adapted to travel along within said tunnel for cooperation with the discharge openings, and positively driven endless belt means associated with said feeder for transferring material from said openings to said conveyor.

4. In a self-unloading ship the combination of a cargo hold having a hopper bottom with a tunnel extending longitudinally beneath the same, said hopper bottom being provided with a series of openings for discharging material from said hold, means for delivering the material exteriorly of the ship including a conveyor in said tunnel, a track within said tunnel, a feeder adapted to travel along said track, and positively driven means associated with said feeder for transferring material from said openings to said conveyor.

5. In a self-unloading ship the combination of a cargo hold having a hopper bottom with a tunnel extending longitudinally beneath the same, said hopper bottom being provided with a series of openings for discharging material from said hold, means for delivering the material exteriorly of the ship including a conveyor in said tunnel, a feeder adapted to travel along within said tunnel for cooperation with the discharge openings, positively driven means associated with said feeder for transferring material from said openings to said conveyor, and means for varying the speed of operation of said positively driven means to thereby regulate the rate of feeding of material to said conveyor.

ROBERT E. SHEAL.
CLIFTON N. WINDECKER.